United States Patent
Andrew et al.

(10) Patent No.: US 7,272,388 B2
(45) Date of Patent: *Sep. 18, 2007

(54) SYSTEM AND METHOD FOR TIMED PROFILE CHANGES ON A MOBILE DEVICE

(75) Inventors: Felix G. T. I. Andrew, Seattle, WA (US); Zeke Koch, Seattle, WA (US); Christopher R. Brown, Seattle, WA (US); Justin M. Maquire, III, Seattle, WA (US)

(73) Assignee: Microsoft Corporation, Redmond, CA (US)

( * ) Notice: Subject to any disclaimer, the term of this patent is extended or adjusted under 35 U.S.C. 154(b) by 32 days.

This patent is subject to a terminal disclaimer.

(21) Appl. No.: 11/242,986

(22) Filed: Oct. 4, 2005

(65) Prior Publication Data

US 2006/0030302 A1 Feb. 9, 2006

Related U.S. Application Data

(63) Continuation of application No. 10/306,782, filed on Nov. 27, 2002, now Pat. No. 6,990,333.

(51) Int. Cl.
*H04M 3/42* (2006.01)

(52) U.S. Cl. .................................. 455/414.1; 455/567
(58) Field of Classification Search ............. 455/414.1, 455/567

See application file for complete search history.

(56) References Cited

U.S. PATENT DOCUMENTS

| | | | |
|---|---|---|---|
| 6,449,479 B1 * | 9/2002 | Sanchez | 455/433 |
| 2003/0207683 A1 * | 11/2003 | Lempio et al. | 455/422.1 |
| 2004/0203768 A1 * | 10/2004 | Ylitalo et al. | 455/435.1 |

* cited by examiner

*Primary Examiner*—Creighton Smith
(74) *Attorney, Agent, or Firm*—Merchant & Gould P.C.; Ryan T. Grace

(57) ABSTRACT

Described is a method and system for providing timed profile changes to a mobile device. The mobile device initiates a timed profile change in response to the user or an event associated with the mobile device. The mobile device monitors the profile period and provides a user with information regarding the length of the profile period remaining, as well as other information. When the period of the selected timed profile expires, the mobile device returns to a previous profile associated with the mobile device.

18 Claims, 4 Drawing Sheets

SYSTEM AND METHOD FOR TIMED PROFILE CHANGES ON A MOBILE DEVICE

REFERENCE TO RELATED APPLICATION(s)

This application is a continuation of application Ser. No. 10/306,782, filed Nov. 27, 2002 now U.S. Pat. No. 6,990,333, which is incorporated herein by reference.

BACKGROUND OF THE INVENTION

Today, there is a variety of mobile devices that are designed to offer users different experiences through various user interface options. For example, there are personal digital assistants, pocket PCs, laptop computers, and the like. Increasingly, these devices are expected to have a greater level of user presentation options.

The user presentation provided by the user interface may include options for changing the ringer volume, notice tones, the screen brightness, the screen content, and the like. A user is able to individually select levels for these user interface options according to their preferences.

SUMMARY OF THE INVENTION

The present invention is directed to a system and method for providing timed profile changes on a mobile device. A profile comprises a number of different outputs presented to the user at a given time, including ring volume or ring tone on a telephonic device, notice tones on a pocket PC, a screen output, or the like. A selected timed profile is activated for a specified period. The selected timed profile alters the user interface provided by the mobile device to coincide with user preferences for that associated period of time.

Typically, a user is required to manually change the user interface of the device in order to coincide with an event. For example, when the user is entering a meeting or other event that requires the mobile device to be silent, the user turns off the volume prior to the meeting. However, when the meeting is ended, often the user neglects to turn the volume back to its original setting. As a result, the user misses notification of calls, messages, reminders, and other notices that occurred after the meeting is ended.

The present invention provides timed profile changes to a mobile device that allows the mobile device to enter a selected profile for a specified period and return to the previous profile when the period expires. In one embodiment, a method is available on the mobile device that allows the user to initiate a selected profile for a specified period. In another embodiment, the mobile device selects the profile according to entries of an associated calendar on the mobile device or another event associated with the mobile device. The length of time a selected profile is active is selectable by the user at the time the selected profile is initiated. The mobile device monitors the period and provides a user with information regarding the length of the period remaining as well as other information. The user is prompted to choose to extend the period at a selectable time prior to the end the period of the selected profile. When the period of the selected profile expires, the mobile device returns to a previous profile associated with the mobile device.

A more complete appreciation of the present invention and its improvements can be obtained by reference to the accompanying drawings briefly summarized below, to the following detailed description of illustrated embodiments of the invention, and to the appended claims.

DETAILED DESCRIPTION OF THE PREFERRED EMBODIMENT

Briefly stated, the present invention is directed to providing timed profile changes on a mobile device. The timed profile changes are selectable or automatically initiated on the mobile device according to a user's preference. These and other aspects of the invention will become apparent to those skilled in the art after reading the following detailed description.

Illustrative Operating Environment

Figure 1:
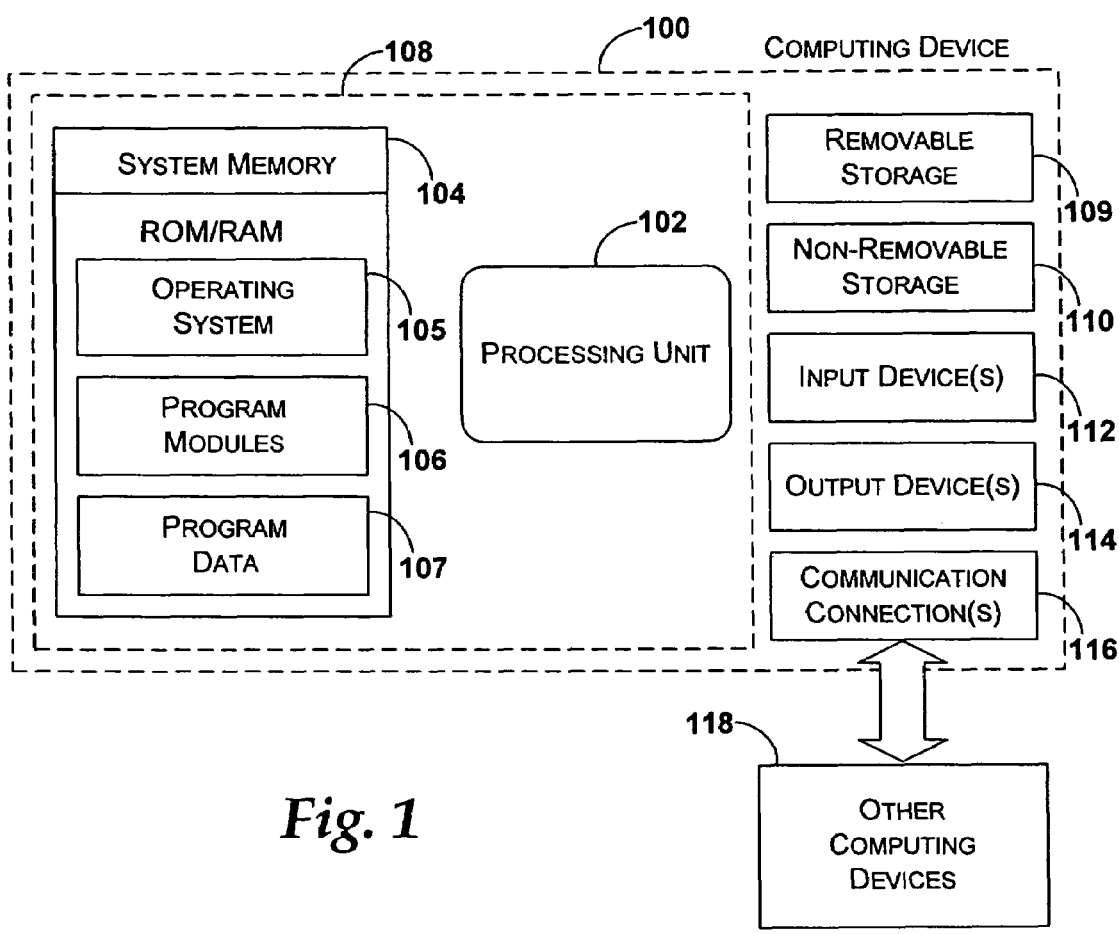
FIG. 1 illustrates an exemplary computing device that may be used in one exemplary embodiment of the present invention.

With reference to FIG. 1, one exemplary system for implementing the invention includes a computing device that may be configured to operate as a mobile device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more program modules 106, and may include program data 107. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well known in the art and need not be discussed at length here.

Computing device 100 may also contain communication connections 116 that allow the device to communicate with other computing devices 118, such as over a network.

Communication connections 116 are one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
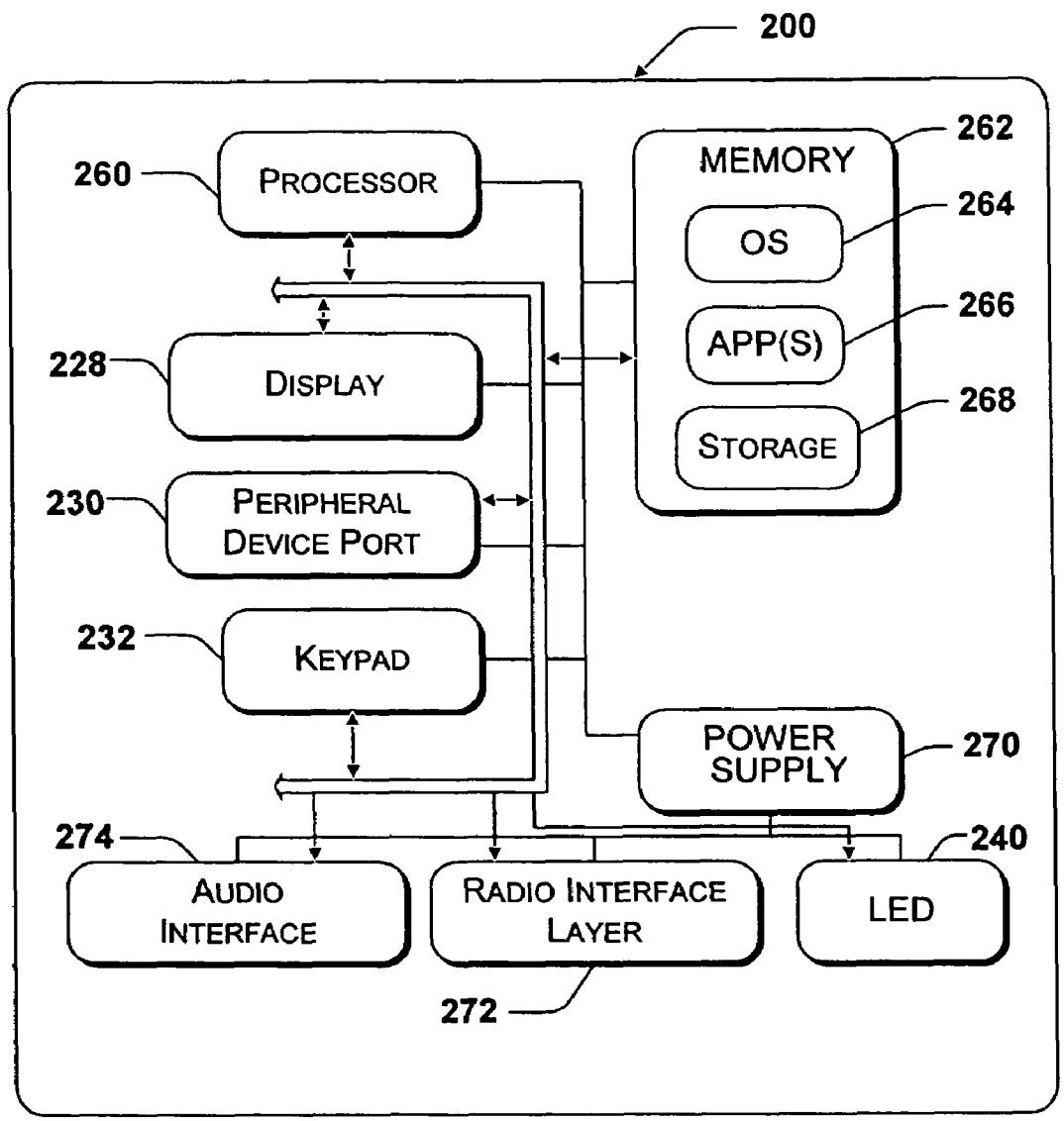
FIG. 2 illustrates an exemplary mobile device that may be used in one exemplary embodiment of the present invention.

With reference to FIG. 2, one exemplary system for implementing the invention includes a computing device configured as a mobile device, such as mobile device 200. The mobile device 200 has a processor 260, a memory 262, a display 228, peripheral device port 230, and a keypad 232. The memory 262 generally includes both volatile memory (e.g., RAM) and non-volatile memory (e.g., ROM, Flash Memory, or the like). The mobile device 200 includes an operating system 264, such as the Windows CE operating system from Microsoft Corporation or other operating system, which is resident in the memory 262 and executes on the processor 260. The keypad 232 may be a push button numeric dialing pad (such as on a typical telephone), a multi-key keyboard (such as a conventional keyboard). The display 228 may be a liquid crystal display, or any other type of display commonly used in mobile devices. The display 228 may be touch-sensitive, and would then also act as an input device. The peripheral device port 230 may be of the type to accept additional memory cards, game cards, modem cards, or other peripheral devices.

One or more application programs 266 are loaded into memory 262 and run on the operating system 264. Examples of application programs include phone dialer programs, installation wizard programs, user interface profile management programs, email programs, scheduling programs, PIM (personal information management) programs, word processing programs, spreadsheet programs, Internet browser programs, and so forth. The mobile computing device 200 also includes non-volatile storage 268 within the memory 262. The non-volatile storage 268 may be used to store persistent information which should not be lost if the mobile computing device 200 is powered down. The applications 266 may use and store information in the storage 268, such as e-mail or other messages used by an e-mail application, contact information used by a PIM, appointment information used by a scheduling program, documents used by a word processing program, device driver programs, and the like.

The mobile computing device 200 has a power supply 270, which may be implemented as one or more batteries. The power supply 270 might further include an external power source, such as an AC adapter or a powered docking cradle, that supplements or recharges the batteries.

The mobile computing device 200 is also shown with two types of external notification mechanisms: an LED 240 and an audio interface 274. These devices may be directly coupled to the power supply 270 so that when activated, they remain on for a duration dictated by the notification mechanism even though the processor 260 and other components might shut down to conserve battery power. The LED 240 may be programmed to remain on indefinitely until the user takes action to indicate the powered-on status of the device. The audio interface 274 is used to provide audible signals to and receive audible signals from the user. For example, the audio interface 274 may be coupled to a speaker for providing audible output and to a microphone for receiving audible input, such as to facilitate a telephone conversation.

The mobile computing device 200 also includes a radio interface layer 272 that performs the function of transmitting and receiving radio frequency communications. The radio interface layer 272 facilitates wireless connectivity between the mobile computing device 200 and the outside world, via a communications carrier or service provider. Transmissions to and from the radio interface layer 272 are conducted under control of the operating system 264. In other words, communications received by the radio interface layer 272 may be disseminated to application programs 266 via the operating system 264, and vice versa.

Illustrative Process for Providing Timed Profile Changes

Figure 3:
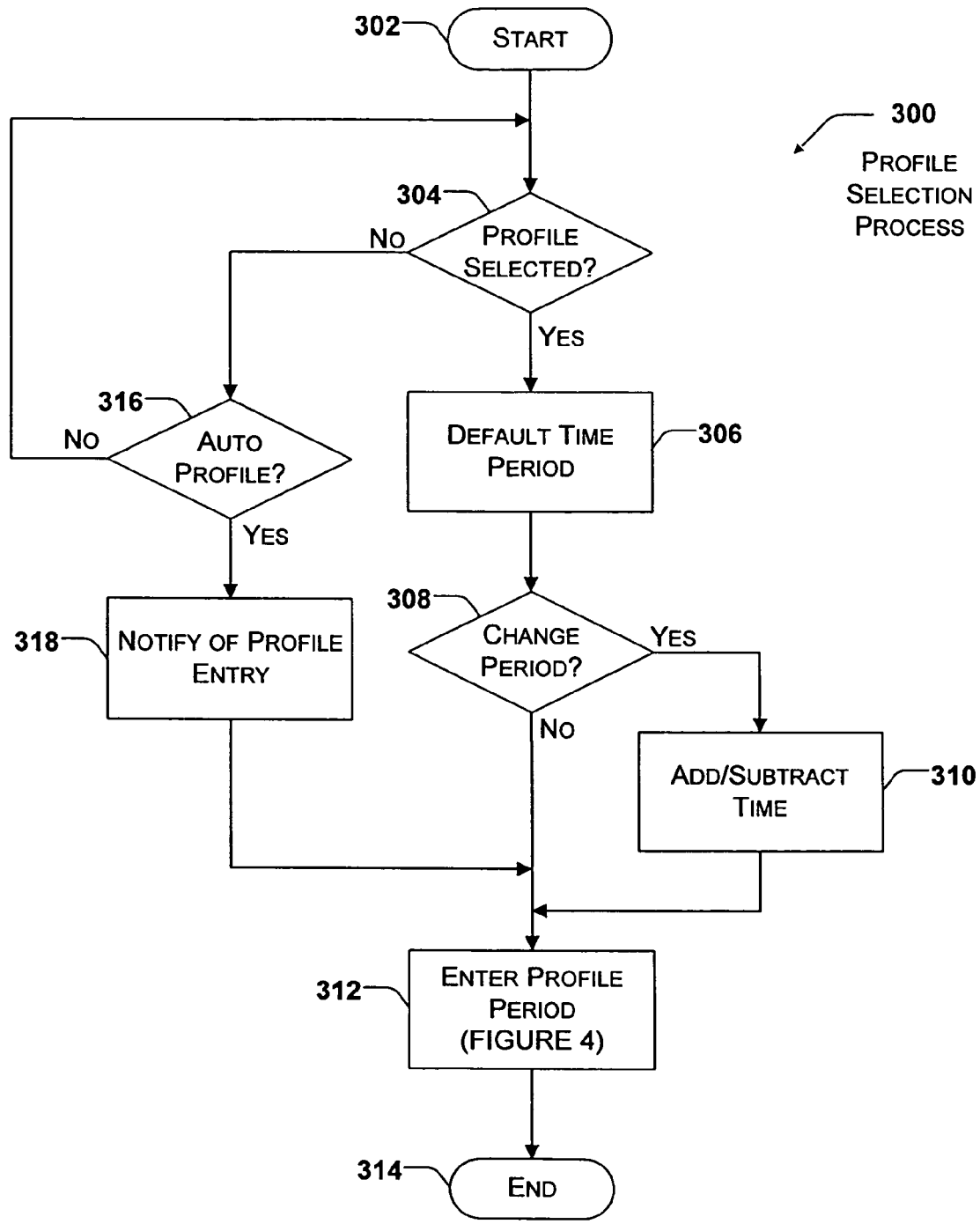
FIG. 3 is a logical flow diagram of an exemplary profile selection process for a mobile device according to the present invention.

FIG. 3 is a logical flow diagram of an exemplary profile selection process for a mobile device according to the present invention. The process 300 begins at start block 302 where the user interface of the mobile device is arranged according to a "standard" profile or a selected profile. A "standard" profile refers to a profile that is active for periods that no timed profile is active. A "period" refers to a selected interval of time. The process 300 continues at decision block 304.

At decision block 304, a determination is made whether a user has selected a timed profile to be activated on the mobile device. In one embodiment, the mobile device includes a user interface option that is utilized to select the timed profile. For example, a navigable menu on the mobile device may include a menu entry such as "Timed Profiles". The user is able select from a list of possible timed profiles for the mobile device from the "Timed Profiles" menu. For example, the "Profiles" menu may include entries for profiles such as "Meeting", "Driving", "Flight", and the like. Selecting one of the profiles results in a number of user interface changes for the mobile device for a selectable period. For example, selecting "Meeting" turns off the volume of the device while activating a vibration mechanism to notify the user of an incoming call, message, or other notification silently. Alternatively, selecting "Driving" sets the volume to its maximum level, activates the vibration mechanism, and activates a flashing visual display in order to compensate for the noise level associated with an automobile. It is appreciated in light of the discussion above that any number of profiles may be used with any number of associated user interface changes including other versions of the "Meeting" and "Driving" profiles. If a timed profile is selected for activation by the user for the mobile device, the process 300 proceeds to block 306.

At block 306, a default period is associated with the timed profile to be activated. The default period corresponds to the duration of an event associated with the selected timed profile. For example, a "meeting" event for a user of the mobile device is typically one hour in duration. The default period set for a "Meeting" timed profile is therefore one hour as well. In another example, the user may fly frequently between two cities that are an average fight time of two hours apart. The default period set for a "Flight" timed profile is therefore two hours. The default periods for each timed profile may be set according to the individual preferences of the user. Alternatively, standard default periods may be set for the profiles of the mobile device prior to the purchase of the mobile device by the user. In another embodiment, default settings are not used for the periods of the timed profiles, and the user is prompted for the period desired prior to activating the timed profile. When a default period is associated with the selected timed profile, processing proceeds to decision block 308.

At decision block 308, a user interface option is presented that allows the user to determine whether to change the period associated with the selected timed profile from the default period. In one example, when a timed profile is selected, the duration of the associated event is different from the default period of the profile. The period of the selected timed profile is therefore changed to correspond to the duration of the associated event. For example, a meeting may be scheduled for two hours when the default period of the associated "Meeting" timed profile is one hour. Prior to entering the period of the meeting event, the user is prompted to change the period of the selected timed profile. If no change to the period of the selected timed profile is desired, processing continues at block 312 described below. Alternatively, if a change to the period of the selected timed profile is desired, the process 300 moves to block 310.

At block 310, the user is presented with a user interface option that allows the period associated with the selected timed profile to be changed. In one embodiment, the user is prompted with two data entry fields that requests the user to enter the amount of time to add or the amount of time to subtract respectively. In another embodiment, a toggle key of the mobile device is pressed "up" or "down" to increase or decrease the period of the selected timed profile respectively. It is appreciated in light of the discussion above that alternative user input methods for increasing or decreasing the length of a period associated with a selected profile may be used. Once the duration of the period associated with the selected timed profile is finalized by adding or subtracting time as necessary, processing proceeds to block 312.

At block 312, the mobile device enters the profile period associated with the selected timed profile. Upon entering the profile period, a timer associated with the selected timed profile is set to count down the period. For example, when the period associated with the selected timed profile is one hour, the timer counts down from the one hour mark to a time of zero. In an alternative embodiment, the timer counts up from a zero mark to one hour. The process of the profile period is described in greater detail in the discussion of FIG. 4 below. Once the mobile device enters the profile period of the selected timed profile, processing continues to block 314 where processing ends.

When a decision is made at decision block 304 that the user has not selected a timed profile to be activated on the mobile device, processing moves to decision block 316. At decision block 316, a determination is made whether a timed profile is to be automatically activated by the mobile device. A timed profile for the mobile device may be selected in response to a calendar or schedule entry associated with the mobile device or other event. For example, a pocket PC includes a calendar that is used to schedule reminders for certain events. The event may be a "meeting" scheduled for one hour at specified time on a specified date. Accordingly, the mobile device automatically selects that the mobile device enter a "Meeting" timed profile during the time that the "meeting" event is scheduled. A timed profile may be associated with each calendar event or scheduled event. In addition, the user can associate a timed profile with a future event on the calendar. For example, an "airline flight" event is entered on the calendar that has a duration of two hours on an upcoming day. At the time the calendar event is entered, the user selects a "Flight" timed profile to be associated with the "airline flight" event. When the "airline flight" event occurs, the mobile device enters the "Flight" timed profile at the start time of the event. It is appreciated in light of the discussion above that various profiles may be associated with each of the calendar events entered by a user on a mobile device.

The timed profile may also be launched according to additional events that are either associated with external stimuli detected by the mobile device, or the calendar of the mobile device. For example, a timed profile may be automatically launched for the weekend days of the calendar. Additionally, "holiday" timed profiles may be launched for holidays that change the ring tones to melodies associated with that holiday and/or change the display to includes holiday elements or colors.

Additionally, events associated with the mobile device may also trigger a timed profile to be automatically launched, such as when "peak" hours of wireless communication change to "non-peak" hours and vice versa, or the detected presence or absence of a wireless network. For example, a user may have a wireless network set up both at their home and their work for network connection to their pocket PC. While the user is at work, a first timed profile is active that is associated with presence of the office wireless network. When the user leaves the office, the first timed profile ends and a second timed profile activates upon the discovery that a wireless network is no longer present. When the user arrives at home, the second timed profile ends and a third timed profile is launched that is associated with the wireless network at home. It is appreciated in light of the discussion of above, that a variety of other events associated with the mobile device may also be used to trigger the activation or deactivation of a timed profile.

If the mobile device does not automatically select to activate a timed profile, processing returns to decision block 304. Alternatively, if the mobile device is automatically activating a timed profile to correspond to an event, processing continues at block 318.

At block 318, a notification is presented by the mobile device alerting the user that the mobile device is entering an automatically selected profile period. Coincident with the alert, the mobile device may present the user with a user interface option that provides an option to cancel the profile change. After the user is notified of the profile change, the process moves to block 312 described above. In an alternative embodiment, the user is alerted of the impending profile change at an interval of the (e.g., 10 minutes) prior to entering the automatically activated profile period. In a further embodiment, a notification that the profile period is to be automatically activated is not presented to the user.

Figure 4:
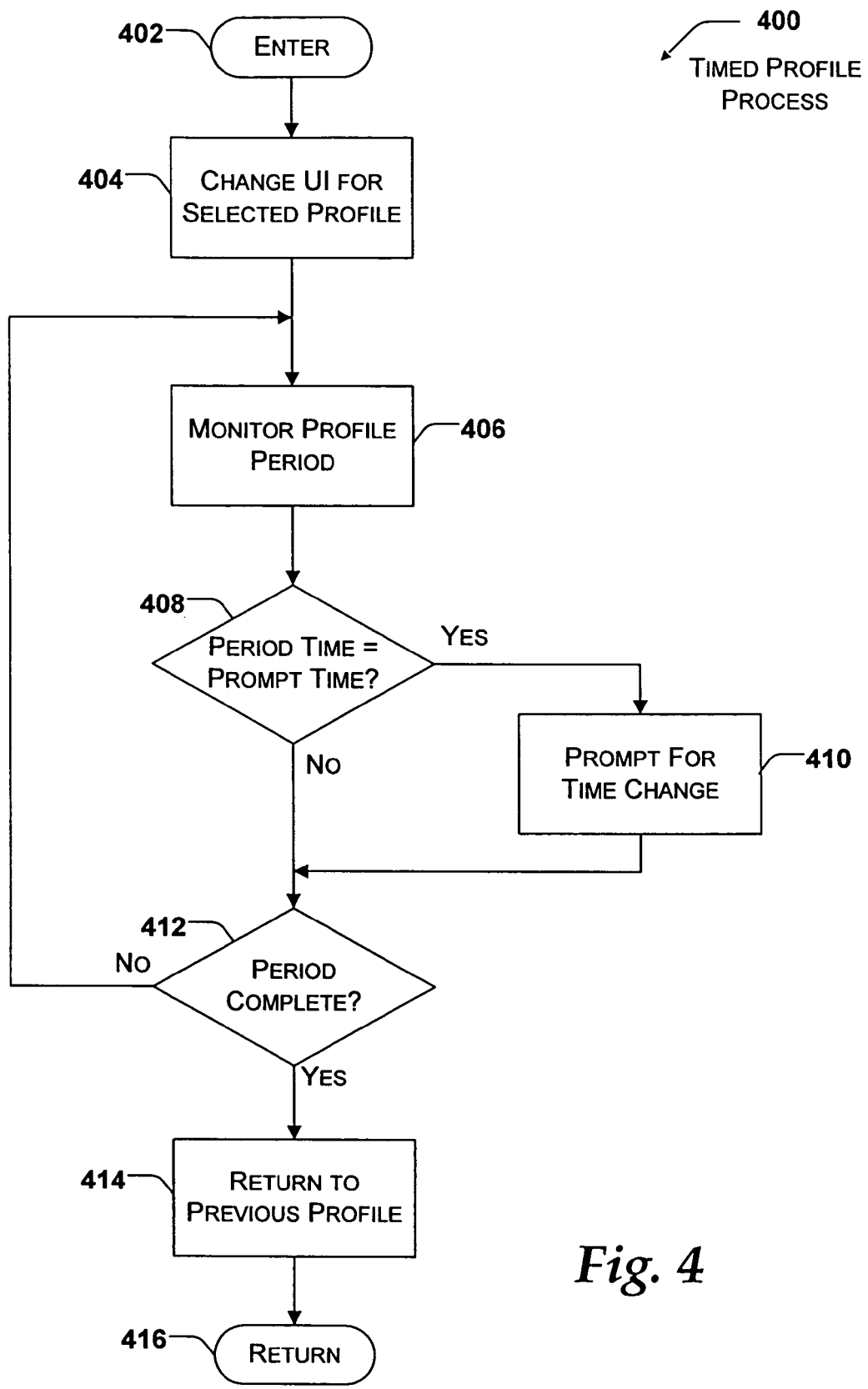
FIG. 4 is a logical flow diagram of a timed profile process in accordance with the present invention.

FIG. 4 is a logical flow diagram of a timed profile process 400 in accordance with the present invention. The process 400 enters at block 402 when process 300 shown in FIG. 3 enters block 312. Processing continues at block 404.

At block 404, the user interface (UI) associated with the mobile device is altered according to the selected timed profile. As previously mentioned, a profile comprises a number of different outputs presented to a user at a given time, including ring volume or ring tone on a telephonic device, notice tones on a pocket PC, a screen output, or the like. For example, on an exemplary "standard" profile, the volume of the mobile device is set at a moderate level, the lighting of the screen is set a moderate level, and any vibration mechanism associated with the mobile device is inactive. When the mobile device activates a selected timed profile, the volume, lighting, and vibration state may each be altered according to the new timed profile. For example, during an "Office" timed profile, where a user is at the office, the volume and lighting may be lowered slightly to correspond to the quieter and brighter environment of an office. It is appreciated in light of the discussion above that user interface changes may encompass a variety of features associated with the mobile device, including audio features, video features, corporeal features, and the like. Processing continues at block 406.

At block 406, the profile period is monitored to determine the remaining duration of the period and provide other feedback to the user. In one embodiment, the screen includes a timer output that shows the time remaining for the timed profile change. Additionally, an indicator of the timed profile selected is also included on the screen of the mobile device. For example, the screen may include text that states "In Meeting" to indicate that a "Meeting" profile is active. Further indicators may also be used to indicate the changes to the user interface of the mobile device, such as an indicator that the sound is off, and an indicator that a vibration mechanism is active. The mobile device provides the user with updated information as the profile period progresses. While the profile period is monitored, processing proceeds to decision block 408.

At decision block 408, a determination is made whether the time remaining for the profile period is equal to a "prompt time". The "prompt time" corresponds to a predetermined time prior to the expiration of the profile period (e.g., five minutes) to prompt the user whether to extend the profile period. If the time remaining for the profile period equals the prompt time, processing continues at decision block 412. Alternatively, if the time remaining for the profile period equals the prompt time, processing moves to block 410.

At block 410, the user is prompted at the "prompt time" as to whether the user desires to change the remaining time of the profile period. For example, five minutes remain for a "Meeting" timed profile, however the meeting is running over the originally expected time. The user may increase the time remaining associated with the "Meeting" timed profile in response to the prompt by the mobile device. In one embodiment, the profile period is not extended without an input by the user to extend the profile period. In another embodiment, the profile period is extended as a default, such that if a user does not select to extend the profile period, the profile period is automatically extended by a predetermined amount of time. Once the user is prompted for any time change by the mobile device and has made any desired change, processing proceeds to decision block 412.

At decision block 412, a determination is made whether the profile period associated with the selected timed profile is complete. The profile period is complete when the remaining time associated with the profile period is zero. If the profile period is not complete, processing returns to block 406, where the process 400 continues to monitor the profile period. Alternatively, if the profile period is complete, processing proceeds to block 414.

At block 414, the mobile device returns to a previous profile associated with the mobile device. In one embodiment, the mobile device includes a "standard" profile that is active whenever a timed profile is not active. When the timed profile is complete, the user interface of the mobile device is returned to the "standard" profile. In another embodiment, the mobile device supports "embedded" timed profiles. For example, when a "Meeting" timed profile ends, the mobile device alters its user interface to correspond to another timed profile, such as an "Office" timed profile that corresponds to when the user is at their office. After the selected timed profile or automatically activated timed profile is complete and the mobile device returns to a previous profile, the process 400 proceeds to block 416. At block 416, the process 400 returns to end block 314 of FIG. 3 where processing ends.

In an alternative process, a time profile may be automatically activated by the mobile device in response to other external inputs. For example, when a user is in a car, the external noise level may increase. The mobile device includes a mechanism for detecting the noise increase. When an increase in the noise is detected, the mobile device automatically enters a timed profile that increases the volume of audio outputs provided by the mobile device (e.g., ring volume) to compensate for the increased noise level. In another example, a detection mechanism (e.g., base station triangulation, GPS, and the like) is used to determine that the mobile device is traveling at a velocity beyond manual capabilities. Accordingly, the mobile device is able to determine that the user is traveling in a vehicle. In response, the mobile device changes to a corresponding timed profile. In this example, the period of the timed profile corresponds to the duration that the mobile device detects the user in the "traveling in a vehicle" state. These types of timed profile changes may be utilized with little to no interaction by the user to respond to external stimuli, in contrast to the processes (300 and 400) shown in FIGS. 3 and 4 which illustrate a moderate level of user input.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer-implemented method for providing timed profile changes on a mobile device, wherein the mobile device includes a user interface, the method comprising:
    providing a timed profile on the mobile device, wherein activation of the timed profile alters the user interface of the mobile device;
    associating a default period with the timed profile, wherein the default period corresponds to a pre-selected interval of time and the default period selected is dependent on the timed profile provided;
    activating the timed profile in response to an input, wherein the timed profile is activated for the default period;
    providing a prompt to extend the default period associated with the timed profile at a prompt time that corresponds to a selected interval of time prior to the end of the period; and
    returning the mobile device to a previous profile when the period of the timed profile is completed.

2. The computer-implemented method of claim 1, wherein the input is a detected input that corresponds to a detection mechanism arranged to detect external stimuli.

3. The computer-implemented method of claim 2, wherein the timed profile is selected to be activated in response to the detected input with minimal user input.

4. The computer-implemented method of claim 1, wherein the input corresponds to an associated schedule entry of a scheduler program associated with the mobile device.

5. The computer-implemented method of claim 4, wherein the timed profile is automatically activated in response to an event.

6. The computer-implemented method of claim 4, wherein the period associated with the timed profile corresponds to the duration of the event.

7. The computer-implemented method of claim 1, wherein returning the mobile device to a previous profile corresponds to returning the mobile device to a standard profile associated with the mobile device, wherein the standard profile is active for intervals of time that the timed profile is inactive.

8. The computer-implemented method of claim 1, wherein returning the mobile device to a previous profile corresponds to returning the mobile device to another timed profile associated with the mobile device.

9. A method for providing timed profile changes on a mobile device, wherein the mobile device includes a user interface, the method comprising:
  receiving a selection of a timed profile from a list of timed profiles provided on the mobile device;
  receiving a profile period associated with the selected timed profile when the selected timed profile is activated, wherein the profile period is a default profile period that corresponds to a default interval of time based on the timed profile selected unless profile period is associated with a user selection;
  altering the user interface of the mobile device to correspond to the selected timed profile;
  monitoring the profile period to determine a duration of the profile period remaining;
  providing a prompt for extending the profile period at a prompt time, wherein the prompt time corresponds to an interval of time prior to completion of the profile period; and
  changing the user interface to correspond to a previous profile when the profile period is complete.

10. The method of claim 9, wherein the timed profile is automatically selected.

11. The method of claim 9, further comprising providing a prompt for changing a duration of the profile period prior to receiving the profile period.

12. A mobile device, comprising:
  a processor;
  a user interface;
  a memory into which a plurality of computer-executable instructions are loaded, the computer-executable instructions performing a method comprising:
    selecting a timed profile from a list of timed profiles provided on the mobile device;
    entering a profile period associated with the selected timed profile when the selected timed profile is activated, wherein the profile period is a default profile period that corresponds to a default interval of time based on the timed profile selected unless the profile period is associated with a user selection;
    altering the user interface of the mobile device to correspond to the selected timed profile;
    monitoring the profile period to determine a duration of the profile period remaining;
    prompting the user to extend the profile period at a prompt time, wherein the prompt time corresponds to a selected interval of time prior to completion of the profile period; and
    changing the user interface to correspond to a previous profile when the profile period is complete.

13. The mobile device of claim 12, wherein the mobile device selects the timed profile from a list of timed profiles to correspond to an event associated with the mobile device.

14. The mobile device of claim 13, wherein the user is notified of the imminent entry to the profile period prior to the occurrence of the profile period.

15. The mobile device of claim 12, wherein changing the user interface to correspond to a previous profile corresponds to returning the mobile device to a standard profile associated with the mobile device, wherein the standard profile is active for intervals of time that the timed profile is inactive.

16. The mobile device of claim 12, wherein changing the user interface to correspond to a previous profile corresponds to returning the mobile device to another timed profile associated with the mobile device.

17. The computer-implemented method of claim 1, wherein the default period is replaced with a user-defined period when the user-defined period is received in association with the timed profile.

18. The computer-implemented method of claim 1, wherein the input provided to the mobile device corresponds to a change in the status of the wireless network.

* * * * *